United States Patent [19]
Klaue

[11] 3,952,842
[45] Apr. 27, 1976

[54] SPREADING DISC BRAKE AND ACTUATOR STRUCTURE

[76] Inventor: Hermann Klaue, Tour d'Ivoire 24 e, 1820 Montreux, Switzerland

[22] Filed: May 15, 1974

[21] Appl. No.: 470,303

Related U.S. Application Data

[63] Continuation-in-part of Ser. No. 288,287, Sept. 12, 1972, Pat. No. 3,885,650, which is a continuation-in-part of Ser. No. 73,566, Sept. 18, 1970, abandoned, Continuation-in-part of Ser. No. 415,681, Nov. 14, 1973, and a continuation-in-part of Ser. No. 457,261, April 2, 1974.

[30] Foreign Application Priority Data

| Dec. 2, 1969 | Germany | 1960286 |
| Dec. 27, 1969 | Germany | 1965171 |
| Dec. 27, 1969 | Germany | 1965170 |
| Aug. 25, 1973 | Germany | 2343004 |
| Nov. 17, 1972 | Switzerland | 16741/72 |

[52] U.S. Cl. .............................. 188/71.4; 188/72.7; 188/73.6; 192/70; 192/70.13; 192/93 A
[51] Int. Cl.² ........................................ F16D 55/04
[58] Field of Search................ 188/71.4, 71.5, 72.7, 188/73.6, 71.8; 192/70, 93 A, 70.13

[56] References Cited
UNITED STATES PATENTS

| 2,732,042 | 1/1956 | Lucker | 188/71.8 X |
| 2,796,153 | 6/1957 | Franzen | 188/21.8 X |
| 2,874,807 | 2/1959 | Hahn | 188/71.4 |
| 2,930,452 | 3/1960 | Klaue | 188/71.4 |
| 3,421,601 | 1/1969 | Klaue | 192/70 X |
| 3,425,518 | 2/1969 | Morrow | 188/71.4 |

FOREIGN PATENTS OR APPLICATIONS

| 1,014,857 | 8/1957 | Germany | 188/71.4 |
| 1,107,095 | 5/1961 | Germany | 188/71.4 |

*Primary Examiner*—George E. A. Halvosa
*Attorney, Agent, or Firm*—Stevens, Davis, Miller & Mosher

[57] ABSTRACT

A fully lined disk brake has a brake housing rotatably mounted on a wheel and segmented arcuate shaped brake shoes supported in the brake housing by a fixed mounting on the wheel assembly which extends over the radially outward open end of the housing to support the brake shoes and is movable from over the open end of the housing to permit access thereto for replacing the brake shoes without dismantling the brake actuating mechanism. The invention provides brake shoes having structure associated with the mounting to support the brake shoes and brake shoe actuating mechanism which automatically adjusts the brakes for optimum operation.

9 Claims, 23 Drawing Figures

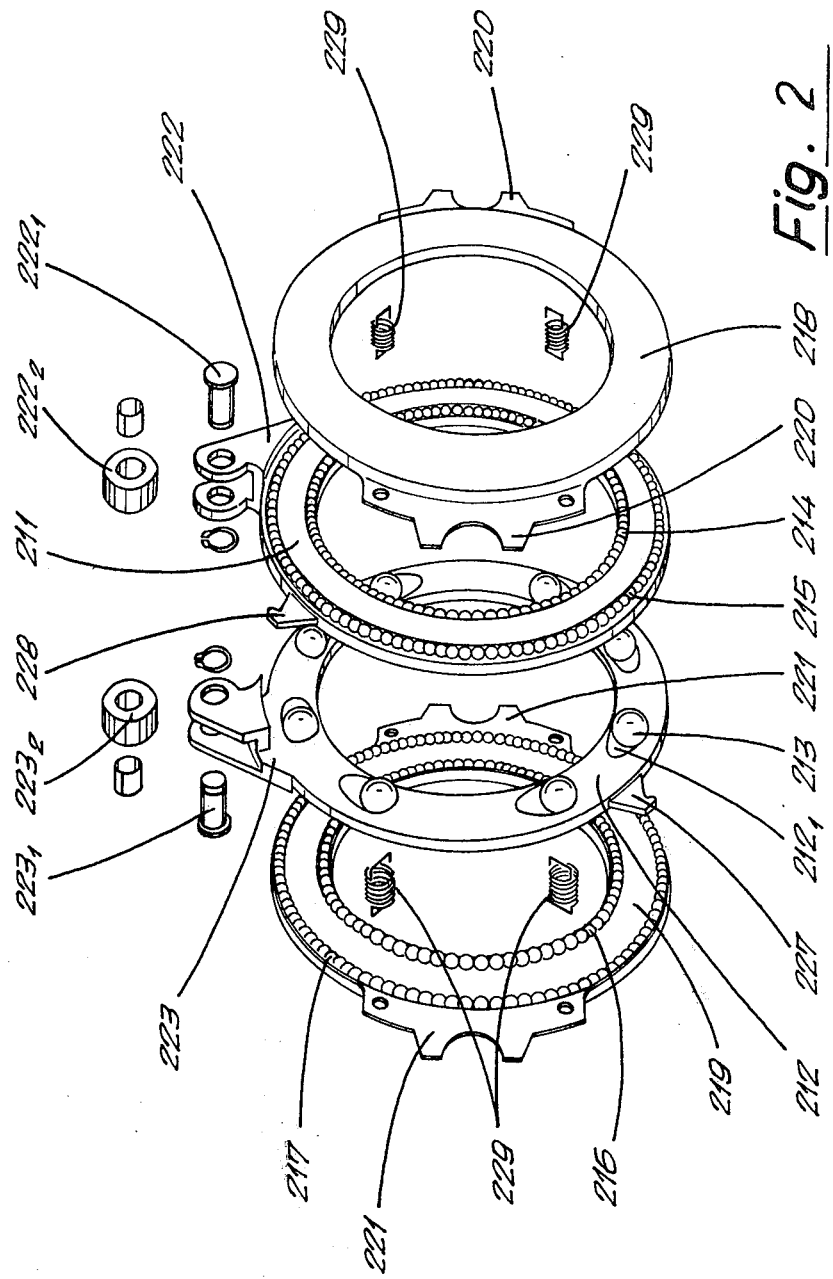

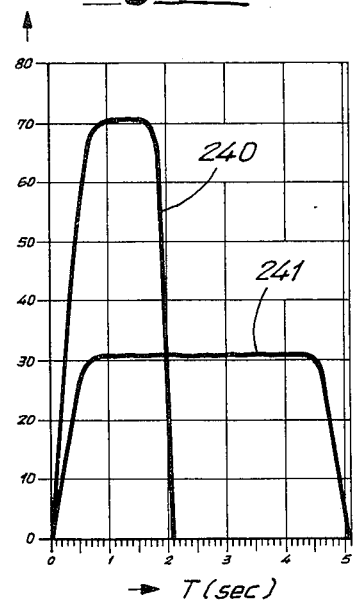
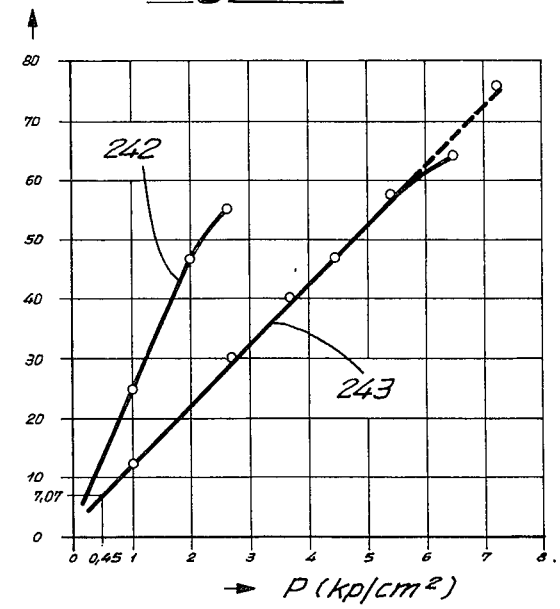
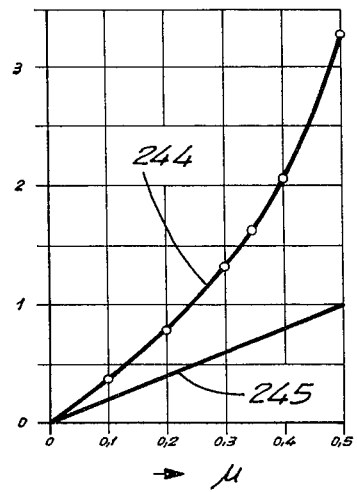
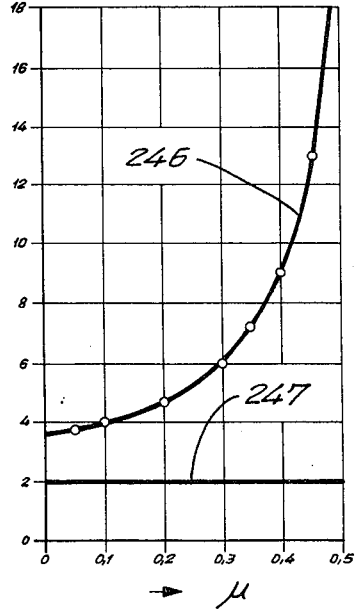

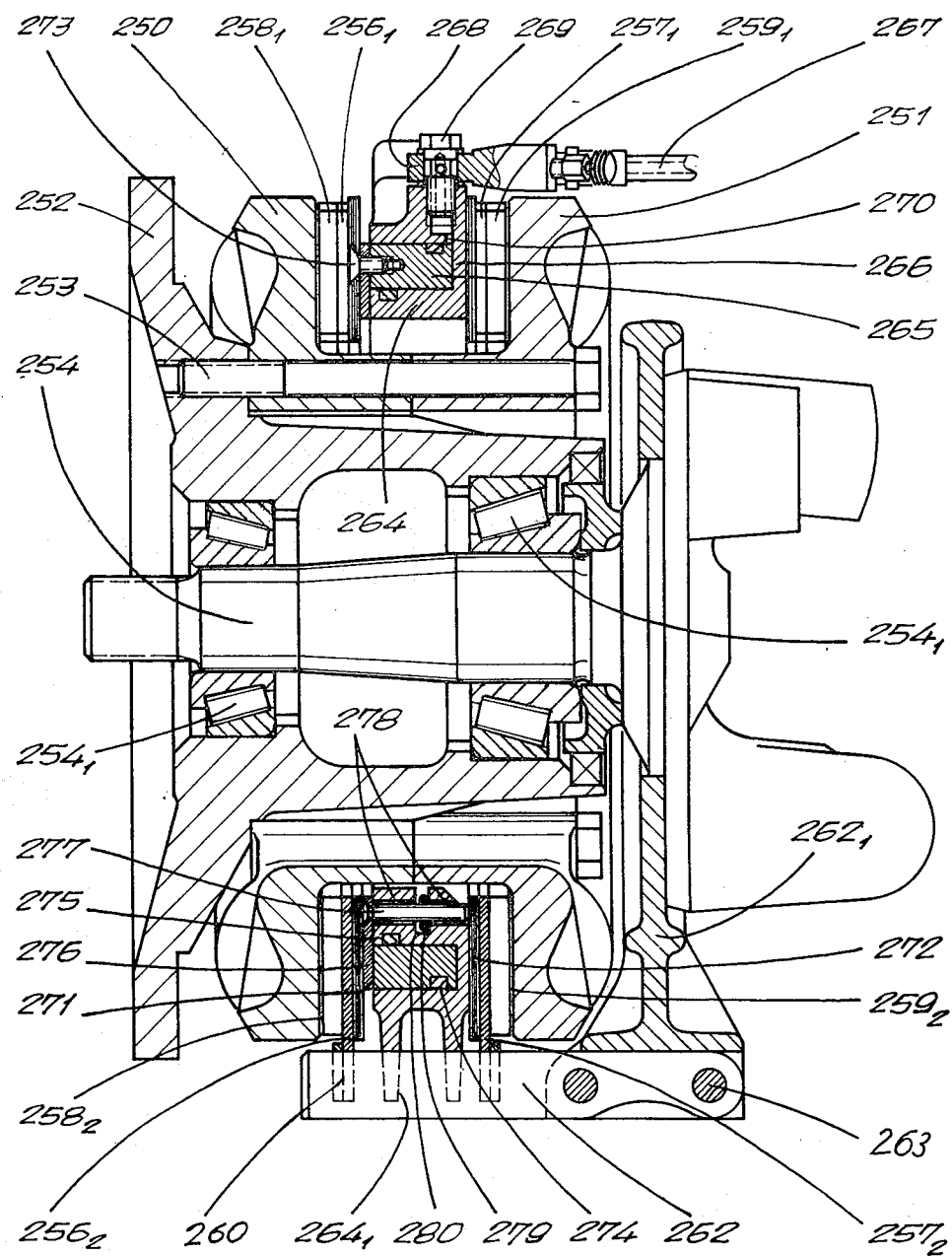
Fig. 7 (A-B)

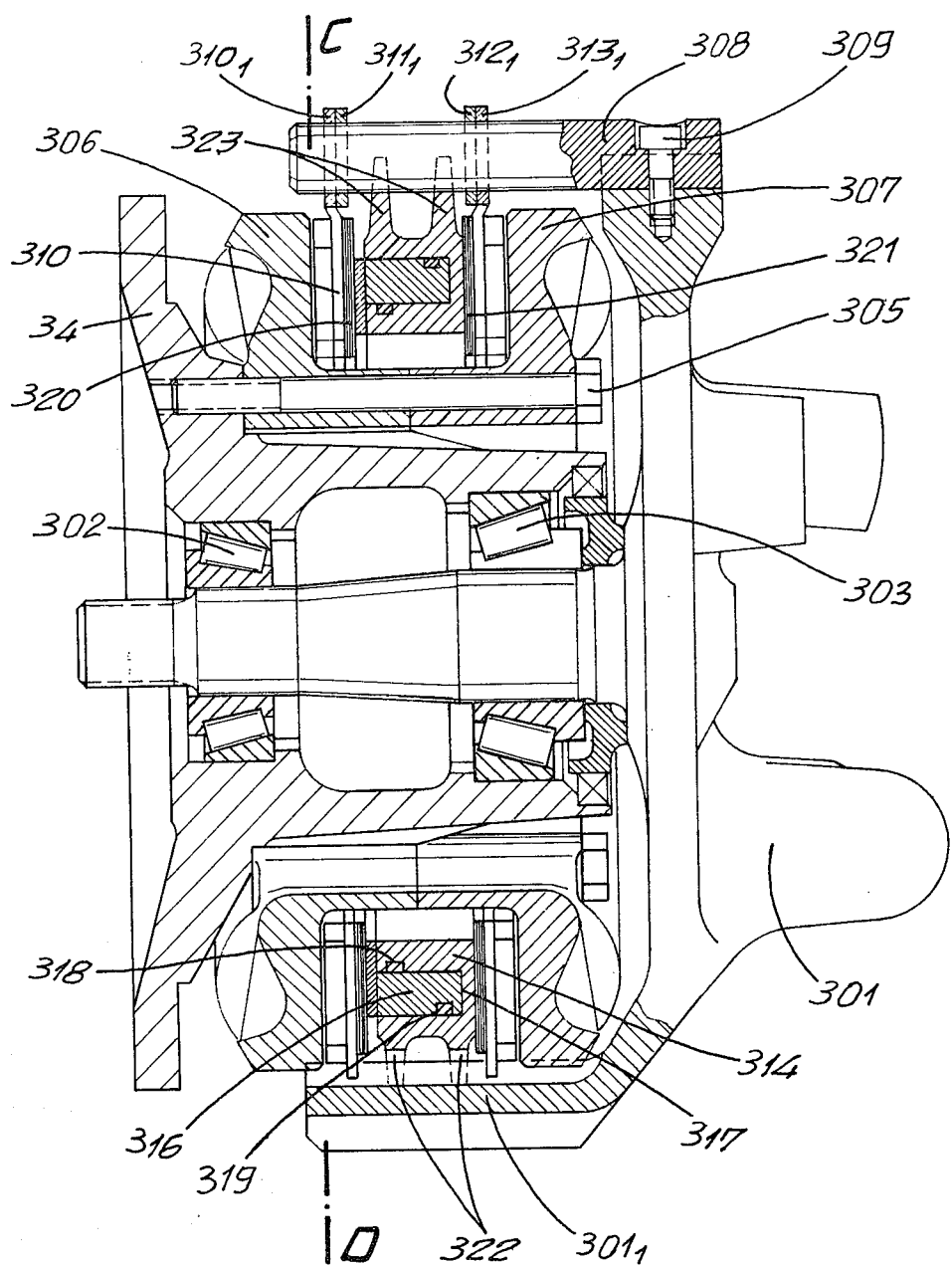
Fig.11 (E-F)

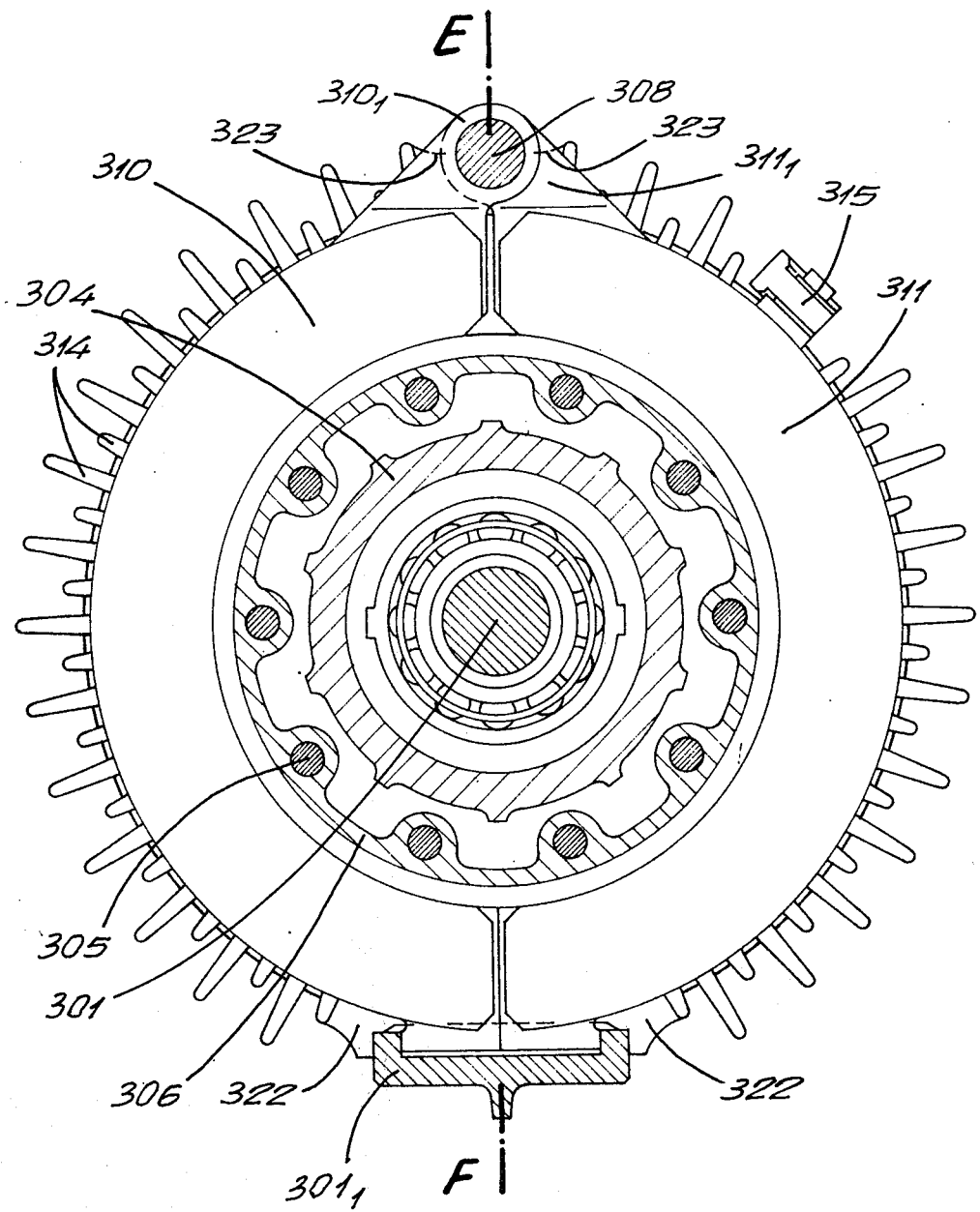
Fig.12 (C-D)

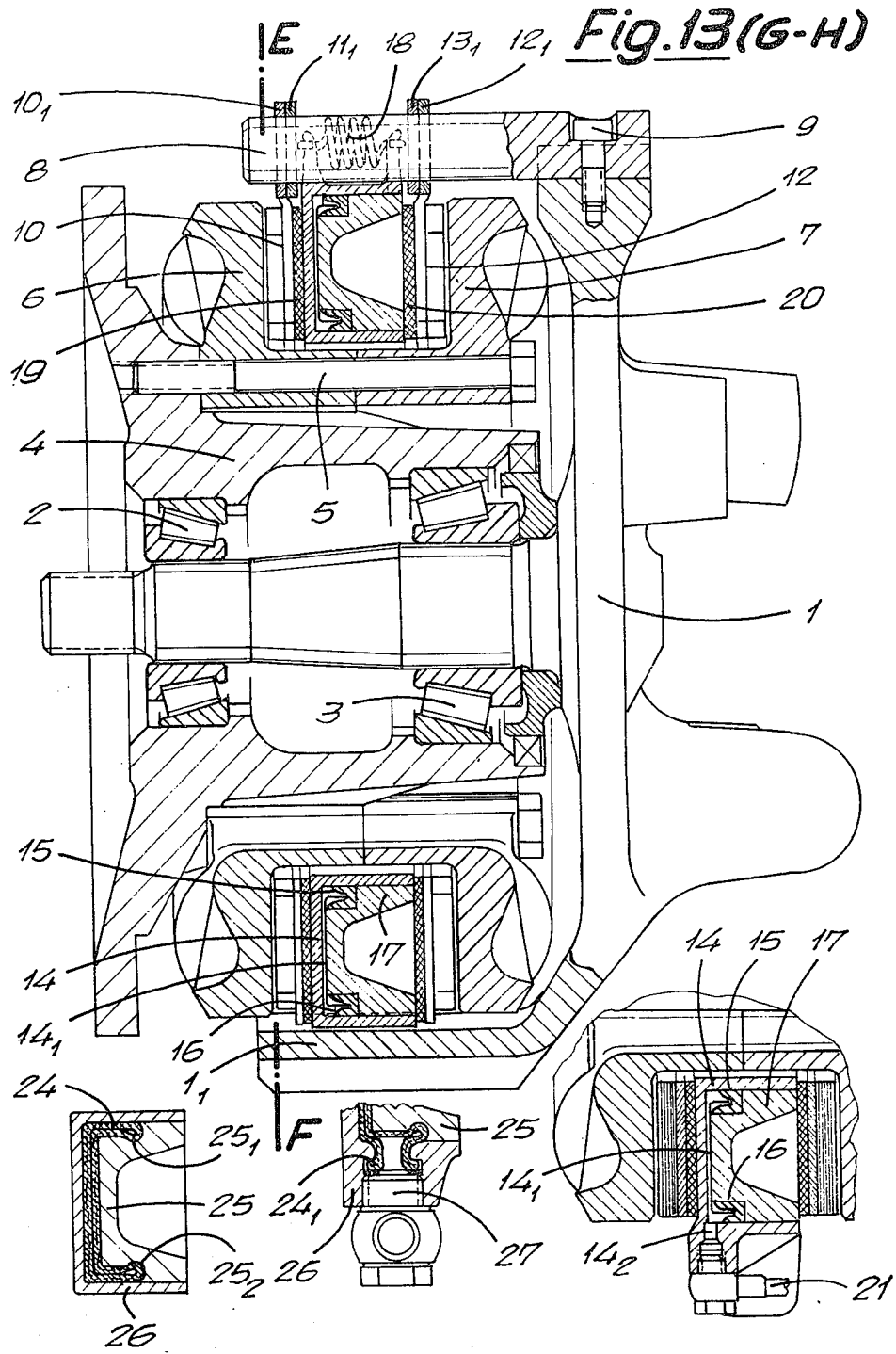

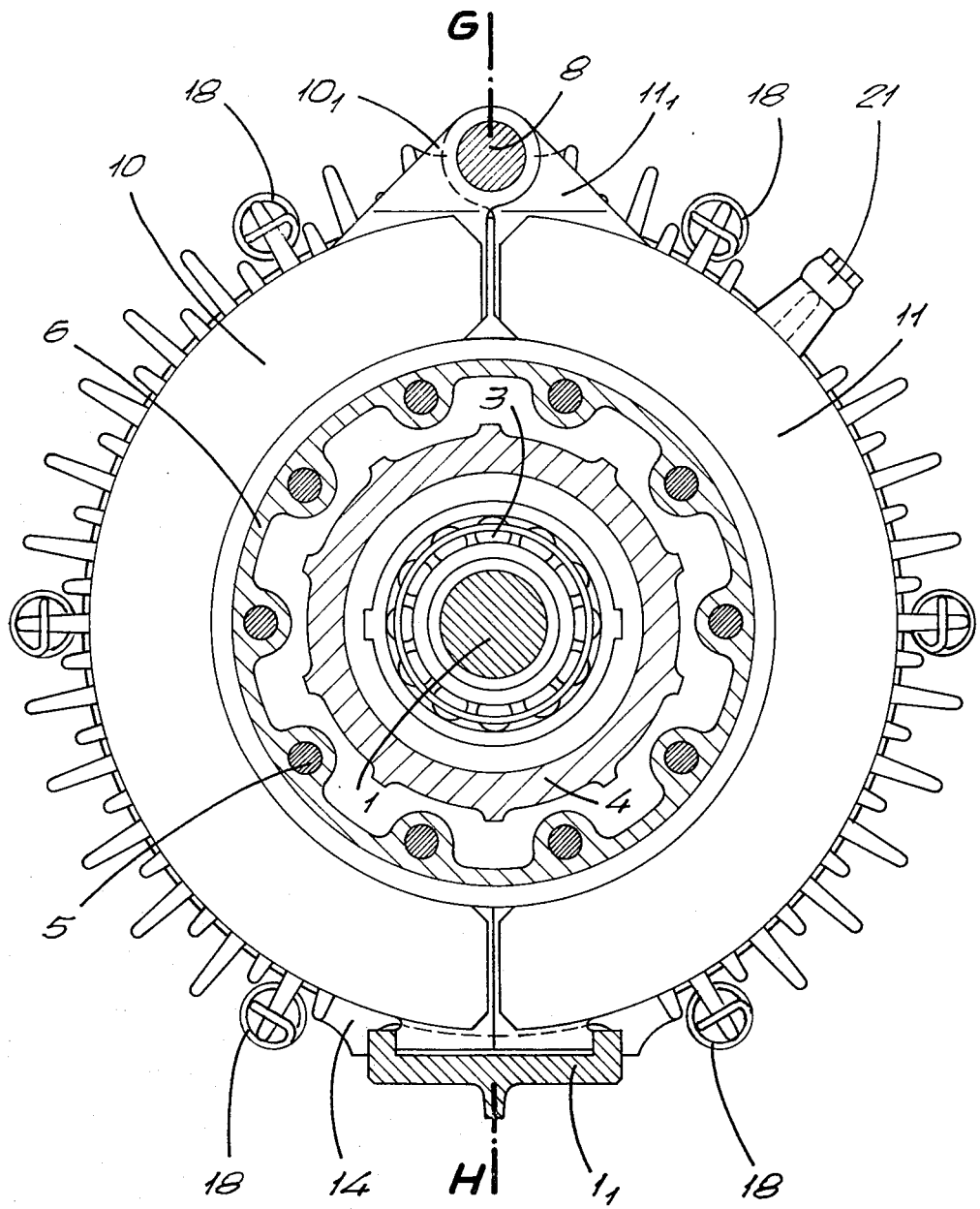
Fig.14 (E-F)

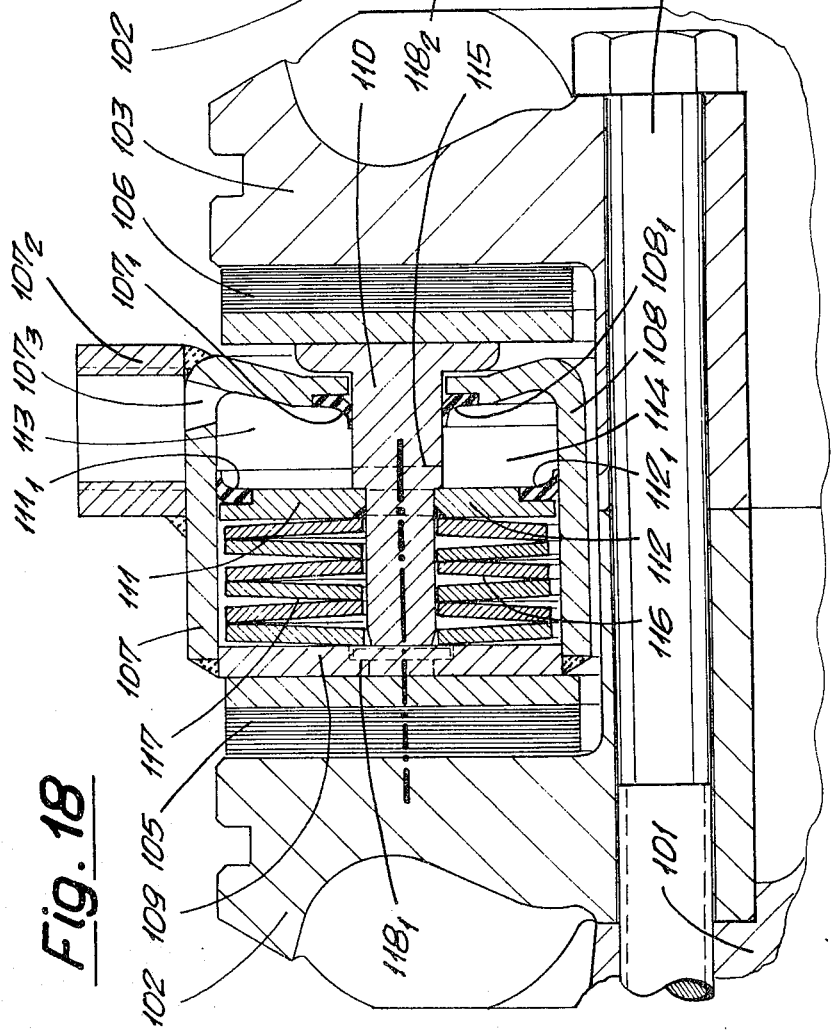

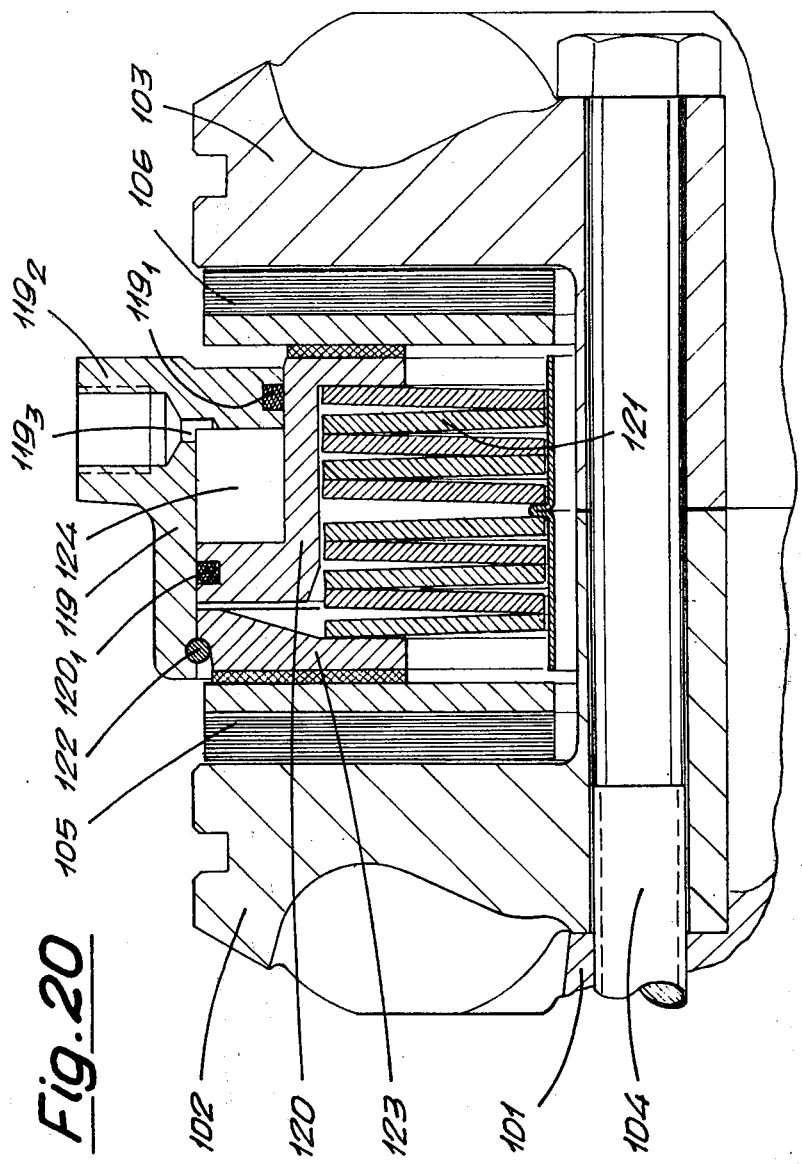

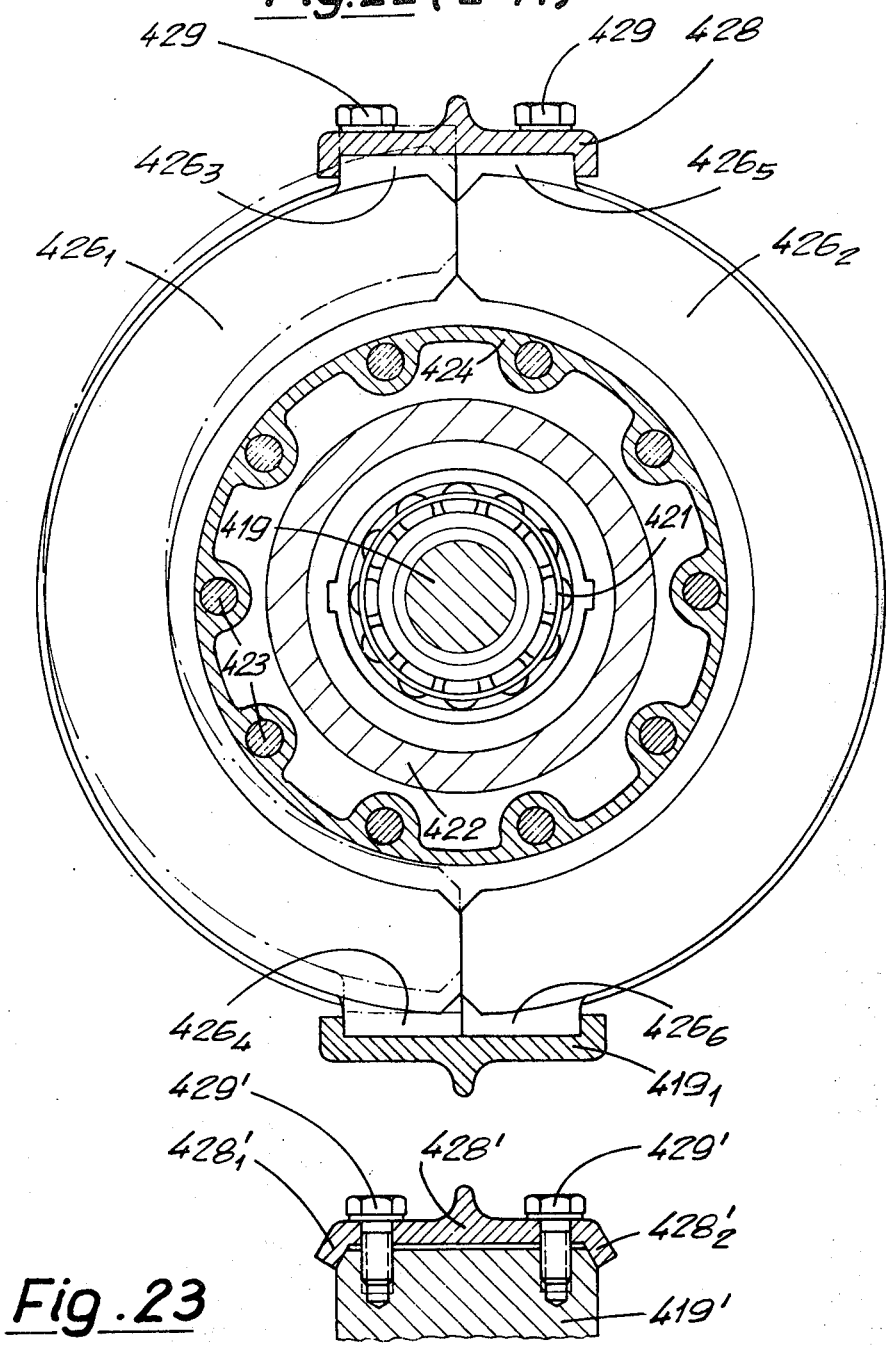

SPREADING DISC BRAKE AND ACTUATOR STRUCTURE

This application is a continuation-in-part of application Ser. No. 288,287, filed Sept. 12, 1972, now U.S. Pat. No. 3,885,650, which is a continuation-in-part of Ser. No. 73,566, filed Sept. 18, 1970, now abandoned. This application is also a continuation-in-part of application Ser. No. 415,681, filed Nov. 14, 1973, and application Ser. No. 457,261, filed Apr. 2, 1974.

This invention relates to fully lined disc-brakes having an external, open brake housing which rotates with a vehicle wheel and a stationary brake holder which extends over the open side of the brake housing and supports the brake shoes within the brake housing. The activating units for moving the brake shoes against the wall of the housing are supported in a space between the brake shoes.

It is an object of this invention to improve upon brakes of this design so that mechanical, hydraulic or pneumatic activating units may be used to move the brake shoes into engagement with the braking surfaces of the housing and to provide maximum efficiency in transmitting the force of the actuating member to the brake shoes when the brakes are activated without unnecessary increase in cost and weight of the brake assembly.

Other objects will become apparent from the following description with reference to the accompanying drawing illustrating embodiments of the invention wherein FIG. 1 is an exploded view of an embodiment of an empirically tested brake assembly with mechanical actuating mechanism;

FIG. 2 is an exploded enlarged view of the actuating unit of the brake assembly of FIG. 1;

FIG. 3 is a graph of braking as a function of time, measured for the brake of FIG. 1;

FIG. 4 is a graph of braking as a function of cylinder pressure, measured with the brake of FIG. 1;

FIG. 5 is a graph of a brake of the kind illustrated in FIG. 1, shown in comparison with a conventional commercial drum-type brake;

FIG. 6 is a graph of the sensitivity of the brake of FIG. 1 compared with that of a conventional, commercial drum brake;

FIG. 7 is a longitudinal section, taken along the line A-B in FIG. 8, of an embodiment provided with a hydraulic brake actuating unit;

FIG. 11 is a longitudinal section taken along the line E-F of FIG. 12 through a front-wheel truck-brake with a hydraulic actuating mechanism;

FIG. 12 is a cross-section taken along the line C-D of FIG. 11;

FIG. 13 is a longitudinal section taken along the line G-H of FIG. 14 through another embodiment of a frontwheel brake with a pneumatic actuating unit;

FIG. 14 is a cross-section through the brake of FIG. 13;

Figure 1:
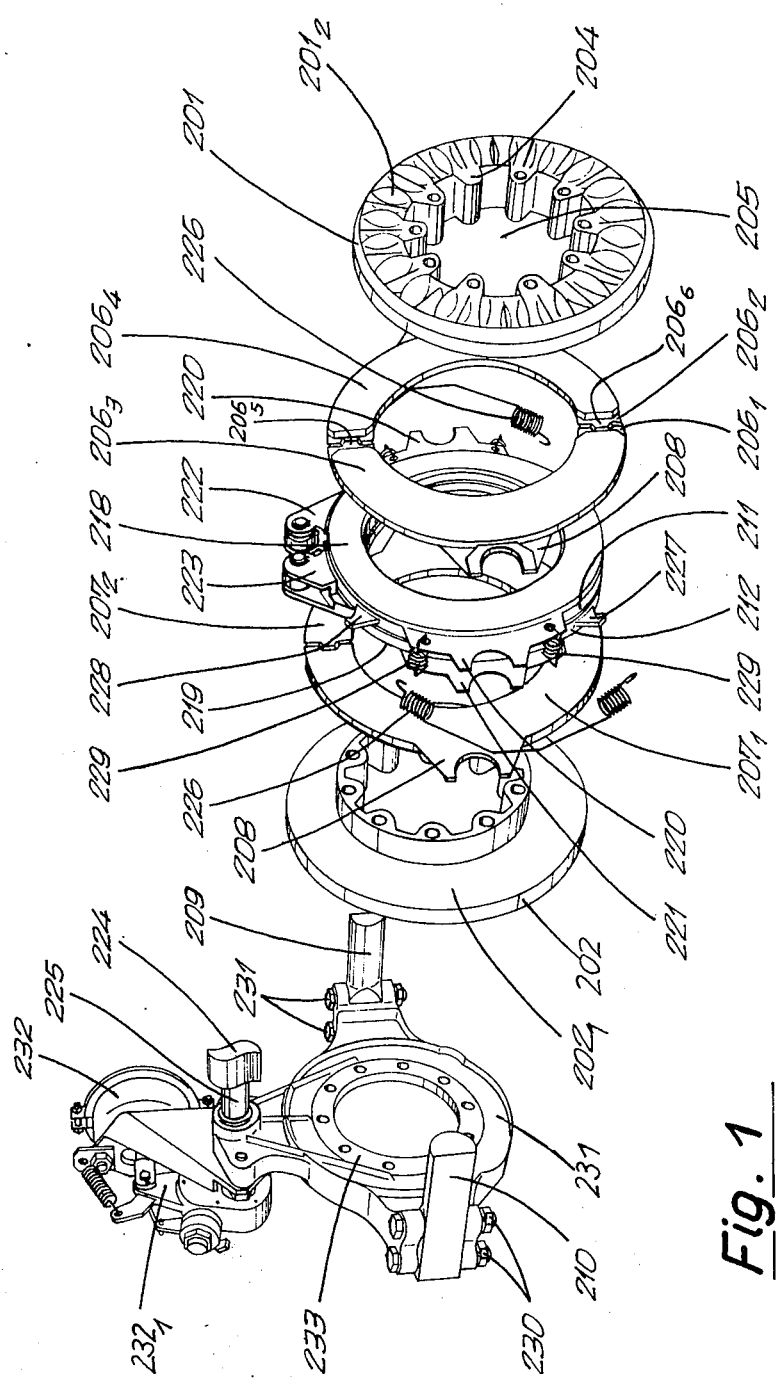
Figure 21:
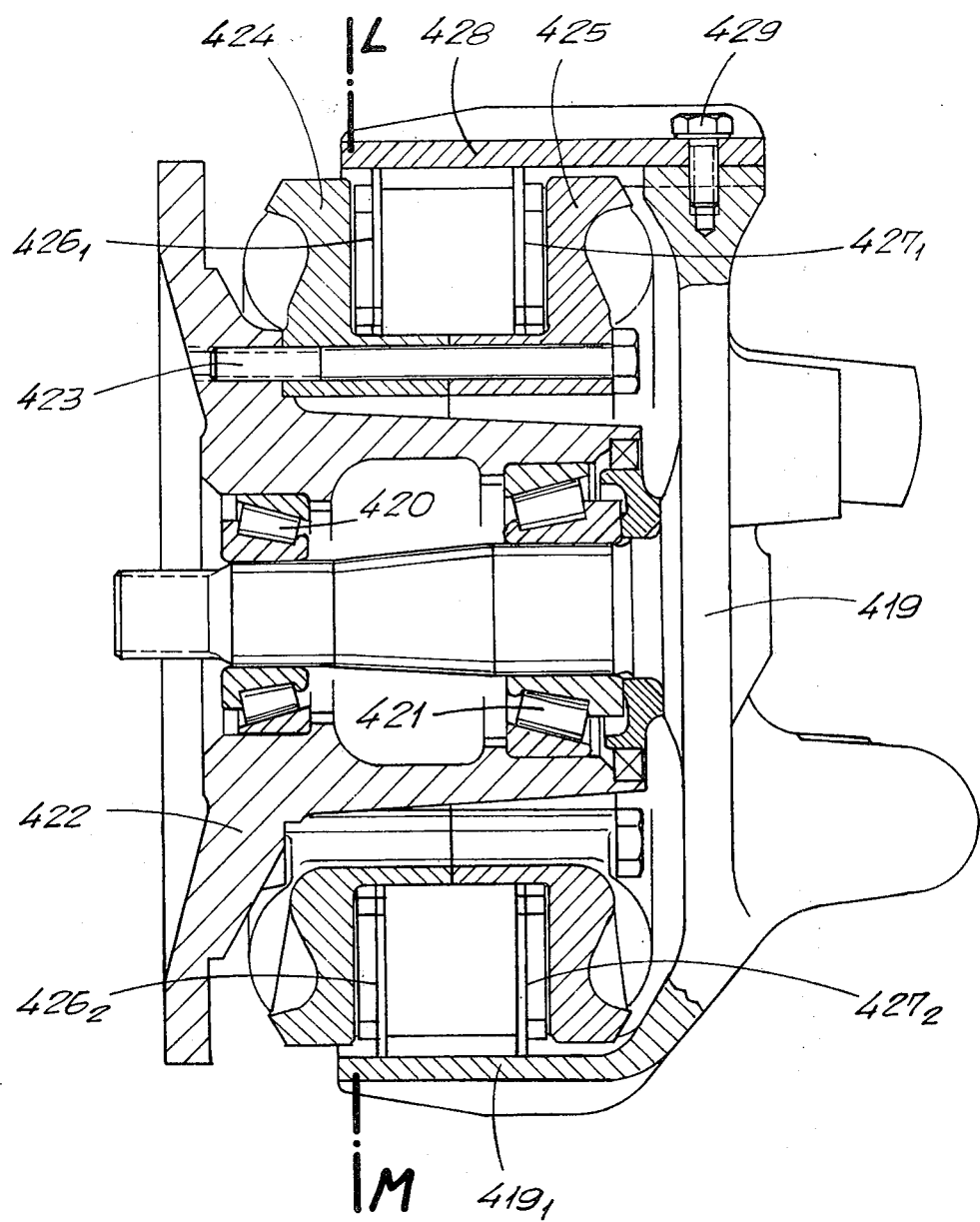

FIG. 15 (on the same page of the drawing as FIG. 13) is a partial section through the compressed-air connection of the brake of FIG. 13;

FIGS. 16 and 17 (on the same page of the drawing as FIG. 13) are partial sections through a variation of the compressed-air chamber seal of the brake of FIG. 13;

FIGS. 18 and 19 are fragmentary sections of a spring-loaded actuating mechanism with compressed-air brake actuation;

FIG. 20 is a fragmentary section of a spring-loaded actuation mechanism with oil-pressure brake actuation;

FIG. 21 is a fragmentary longitudinal section of a brake assembly having a U-shaped bracket for supporting the braking components;

FIG. 22 is a cross-section taken along the line L-M of FIG. 21; and

FIG. 23 is a fragmentary view of a variation of the embodiment of FIG. 22.

The foregoing objects and others are accomplished in accordance with this invention, generally speaking, by providing a braking mechanism particularly advantageous for use in heavy motor vehciles such as trucks having a. a brake housing formed from two spaced annular members providing an annular gap or channel therebetween open on its radially exterior side, the opposite inner sides of the brake housing acting as braking surfaces; the brake housing being attachable to be rotatable jointly with a wheel assembly to be braked;

b. semi-circular brake shoes disposed in the annular channel and having friction linings facing the braking surfaces; a brake holder disposed over the open side of the channel and having arms which support the brake shoes in the channel and against rotation with the brake housing, the brake arms being movable from over the channel by pivoting outwardly or otherwise swinging therefrom to permit changing of the friction linings or brake shoes without dismantling the brake housing or the brake actuating mechanism; and c. an annular brake shoe actuating unit mounted between the brake shoes for moving the brake shoe linings into engagement with the braking surfaces mechanically, hydraulically or pneumatically by spreading the brake shoes apart in the channel formed by the brake housing.

In one embodiment of the invention, two semi-circular brake shoes with friction-linings, each in the same plane, are provided, which are supported in the channel by mutual contact along their contact edges and by means of extensions on the brake holder arms, and which may be removed from the channel or gap of the brake housing after removal of the brake-holder arms without dismantling the actuating mechanism.

In still another embodiment of the invention, the actuating unit consists of rotatable actuating rings with ballbearings, and jam-proof support rings supported on the brakeholder arms and mounted between the actuating rings and the brake shoes. The support rings and actuating rings are provided with ball-bearings held in two concentric races.

In a still further embodiment of the invention, a hydraulic actuating unit is installed between the brake shoes, the unit comprising an annular cylinder and an annular piston encompassing an annular chamber, a braking-fluid supply line to the annular chamber, insulating rings, gaskets or sealing means, and an automatic, continuously adjusting mechanism. The hydraulic actuating unit may be replaced in a further embodiment of the invention by a pneumatic actuating unit which is also an annular cylinder and an annular piston.

The invention also contemplates operating the brake by means of automatic spring-loading with pneumatic or hydraulic relief.

The invention provides for the exchange of brake shoes and their friction linings without dismantling the brake actuating means and improves torque or brake reaction by providing at least one brake-holder extension or arm which is detachable for replacing the semi-circular brake shoes or brake lining segments at the center of the two brake-holder extensions or arms.

The embodiments shown in FIGS. 1 and 2 of a full-disk brake for heavy trucks was tested empirically in actual operation. The test results are shown in FIGS. 3 through 6. There is no connection between the brake shoes in this embodiment. They brace each other. Dismantling thereof is possible after swinging the brake-holder arms down.

Two annular brake cover plates 201 and 202 provided with annular inwardly protruding rims 203 along their inside periphery are bolted together in spaced face to face relationship to form a brake housing with an annular space or channel open along its radially outward side. Boreholes 204 are provided for bolting (not shown) together the two brake cover plates 201 and 202 and circular opening 205 is provided for insertion of a hub or similar rotating part of a wheel to be braked. The brake housing is bolted to and rotates together with the hub while the stationary components of the brake assembly are connected to a stationary part of the wheel assembly, for instance, the steering knuckle. The opposite inside faces $201_1$ and $202_1$ of brake cover plates 201, 202, respectively, are designed as braking surfaces, whereas the outside faces have radial fins $201_2$ and $202_2$ for cooling.

Disposed within the channel between braking surfaces $201_1$ and $202_1$ are semi-circular brake shoes $206_1$, $206_2$ and $207_1$, $207_2$. Each brake shoe is of arcuate shape and has a friction lining on its outer surface facing a braking surface as shown for brake shoes $206_1$, $206_2$ with linings $206_3$, $206_4$ in FIG. 1. The brake shoes are formed with bifurcated shoulders 208 adapted to support the shoes on two stationary yet removable brackets 209 and 210 bolted to the brake holder 231 (FIG. 1). The brake shoes are supported so they cannot move radially but are movable by the brake actuating mechanism therebetween in an axial direction. The brackets 209 and 210 are rounded-off in cross-section to provide a semi-circular bearing surface for the shoulders 208 to prevent jamming or locking when transmitting the braking torque. Furthermore, the ends of the brake shoes contact and brace each other so it is not necessary to provide a means for connecting them together. Preferably, the brake shoe shoulder 208 is formed at the same angle as the ends of the brake shoes.

Appropriately the brake shoes shall make contact in a plane passing through the center of the line connecting the shoulders 208 and normal to the same.

The brake shoe operating means has two actuating rings 211 and 212 disposed between but separate from the brake shoes. Ball-bearings 213 are disposed in slots or tracks $212_1$ of actuating ring 212. Thrust rings 218 and 219 are disposed between actuating rings 211 and 212 and brake shoes $206_1$, $206_2$ and $207_1$ and $207_2$. The thrust rings 218 and 219 are supported on brackets 209 and 210 by bifurcated shoulders 220, $220_1$, and 221, $221_1$, so that the thrust rings 218 and 219 are free to slide towards or away from one another but are held against circumferential movement. Ball-bearings are provided between thrust rings 218 and 219 and actuating rings 211 and 212, in two concentric annular races 214 and 215 on actuating ring 211 and races 216 and 217 on thrust ring 219 for ball-bearing support of the actuating rings. Pull-off coil springs 229 connected to each of the thrust rings hold the components of the actuation unit together.

Actuating rings 211 and 212 are provided with axially spaced pairs of extensions 222 and 223. Each pair of extension has aligned holes to receive pins $222_1$ and $223_1$. Pressure rollers $222_2$ and $223_2$ are rotatably disposed on pins $222_1$ and $223_1$. An S-shaped double cam 224 mounted on spindle 225 is disposed between the pressure rollers $222_2$ and $223_2$. Spindle 225 is rotatably supported on stationary brake holder or carrier 231 externally of the brake assembly and is connected to actuating lever $232_1$, which is operably connected to compressed air cylinder 232. As illustrated in FIGS. 1 and 2, when the compressed-air brake cylinder is energised to effect a braking operation, the spindle 225 is rotated by appropriate operation of the actuating lever $232_1$ so that the cam 224 is pressed against the pressure rollers $222_2$ and $223_2$ whereby the actuating rings 211 and 212 are angularly displaced relative to each other. Pull-off springs 226 provided between the actuating rings 211, 212 connected at extensions 227, 228 thereof are adapted to pull the actuating rings into initial position when releasing the brake. Pull-off springs 229 provided between the thrust rings 218, 219 connected at the shoulders 220, 221, operate to pull the thrust rings towards one another to release the brake when the actuating force is released.

Brackets 209, 210 are pivotally mounted to the stationary brake carrier 231 by means of bolts 230. This permits changing the brake shoes without dismantling the brake assembly by moving aside the brackets. The brackets are bolted through bolt holes 233 to a stationary part of the wheel assembly such as the steering knuckle. Replacement of the brake shoes is performed after pivoting the brackets 209 and 210 without disassembling the actuating unit.

FIGS. 3 through 6 show some of the results obtained from testing the fully lined disk-brake provided by the invention. One brake of the invention was mounted on each of the four wheels of a truck. The graph of FIG. 3 reflects the data obtained in full-braking tests with a loaded truck weighing 14,060 kp travelling at a speed of 50 km/hour with an air pressure of 7 kp/cm$^2$ on the brake actuating means. FIG. 3 shows the deceleration (%) A as a function of time T for those conditions, curve 241 relating to the foot brake and curve 240 to the handbrake.

FIG. 4 shows the %-deceleration A as a function of cylinder pressure P in kp/cm$^2$, curve 243 relating to a loaded truck weighing 14,060 kp, while curve 242 relates to an empty truck weighing 5,800 kp. The dotted extension of curve 243 indicates the range where the force available from friction between wheels and road is exceeded and where the wheels are locked.

FIG. 5 shows the ratio B = (tangential decelerating force)/(spreading or expansion force) plotted as a function of the friction coefficient u. Curve 244 relates to a conventional commercial drum brake, curve 245 to the disk brake of the invention. FIG. 6 shows the sensitivity $\phi$ with respect to fluctuations in friction, plotted as a function of u.

The sensitivity $\phi$ is defined — as is known — as the first derivative of the curve B, tan $\phi = (d/du)$ (tangential braking or decelerating force/spreading or expansion force). curve 246 again relates to the conventional, commercial drum brake, while curve 247 relates to the disk brake of the invention; the lack of slope of the latter curve proves the insensitivity of the brake of the invention to fluctuations in the friction coefficient.

Insensitivity to temperature variations in the brake of the invention may be shown any time by means of the experimental vehicle. Continuous braking lasting 12 minutes will be simulated at a speed of 50 km/hour, corresponding to a downward slope of 7% for a length of 6 km. This is equivalent to a constant actuating pressure of 0.8 atm. gauge in the cylinder of the truck. Whereas a conventionl drum brake would be destroyed by such a continuous test, the disc brake of the invention will be at a temperature of 290° C measured 3 mm below the brake surface at the housing.

FIGS. 7 through 10 illustrate another embodiment of the brake of the invention, comprising a hydraulic actuation unit but otherwise the same in design and arrangement of the brake shoes as in the previous embodiment. This brake is suitable for installation in heavy trucks up to 14 kp in weight and is illustrated as a truck front-wheel brake in the present embodiment.

The brake housing has two complementary halves 250 and 251 bolted together at their inner periphery by means of bolts 253 and to the integral flange of hub 252. The brake housing is provided with many radial fins on its outer face for the purpose of cooling; the opposite inner faces of the brake housing halves 250 and 251 are designed as braking surfaces. Hub 252 is journaled by means of taper roller bearings $254_1$ on steering knuckle 254.

Disposed in an annular gap or channel are two pairs of semi-circular brake shoes $256_1$, $256_2$, $257_1$, $257_2$. Friction linings $258_1$, $258_2$, $259_1$, $259_2$ are secured to the brake shoes and face the braking surfaces of the housing. A shoulder-like extension 260 on each of the brake shoes $256_1$, $256_2$ and $257_1$, $257_2$ is supported by two stationary but removable brake holder members 261 and 262 which extend over the open end of the channel between cover plates 250 and 251, preferably circular in shape, in such manner that thay may be displaced in an axial direction but are held against circumferential movement.

The brackets or brake holder members 261 and 262 are mounted by screws 263 to a brake carrier $262_1$ attached to steering knuckle 254 in such a manner that they may be pivoted or swung downwardly from over the open peripherial edge of the channel and the brake shoes then replaced without further disassembly of the actuation unit. Preferably, the extensions 260 on the brake holder or carrier $262_1$ will subtend the same angle at both ends of the brake shoes so that the brake shoes will brace each other in the same plane passing through the center of the line connecting the two brackets 261 and 262 and normal to the line, so that any further connecting means will be superfluous.

The braking fluid for actuating the hydraulic unit is supplied through hose 267, annular connector 268 with a hollow screw 269 and borehole 270 into the annular chamber 266. Sealing rings 274 and 275 are used to seal annular space 266. Sealing ring 274 is disposed in an annular groove of ring piston 265, while sealing ring 275 is disposed in a ring groove in ring cylinder 264.

Two heat insulating rings 271 and 272 of a heat-resistant material are mounted on the ring cylinder 264 or piston 265 between the ring cylinder or piston and the brake shoes, for instance by means of peripherally located screws 273, as shown for insulating ring 271. The braking or decelerating force exerted by the braking fluid in ring chamber 266 will force the cylinder and piston apart, against the opposing action of the pull-off springs 255 provided between the insulating rings for releasing the brake when hydraulic pressure is removed.

Figure 8:
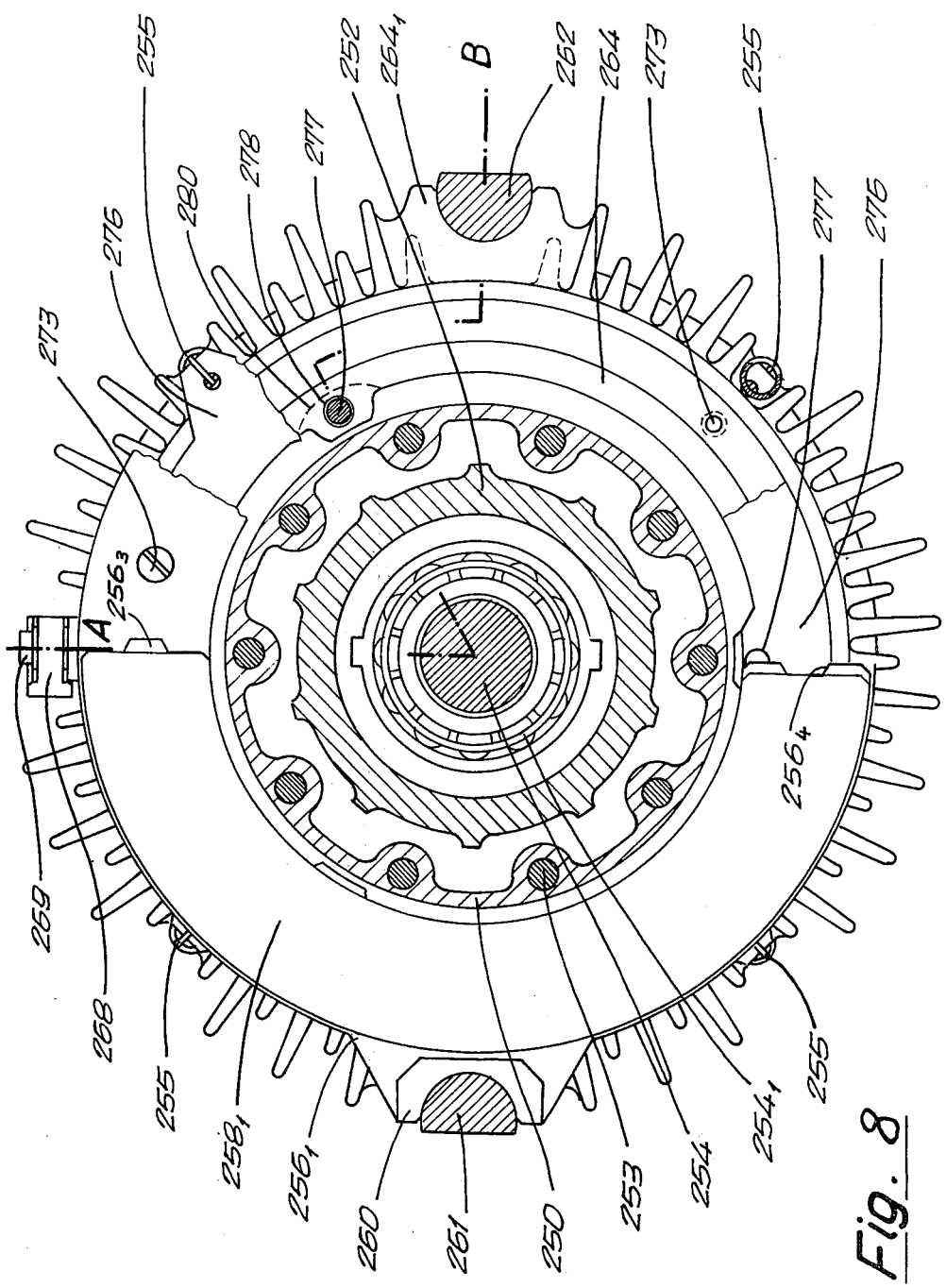
FIG. 8 is a cross-section of the embodiment of FIG. 7.
Figure 9:
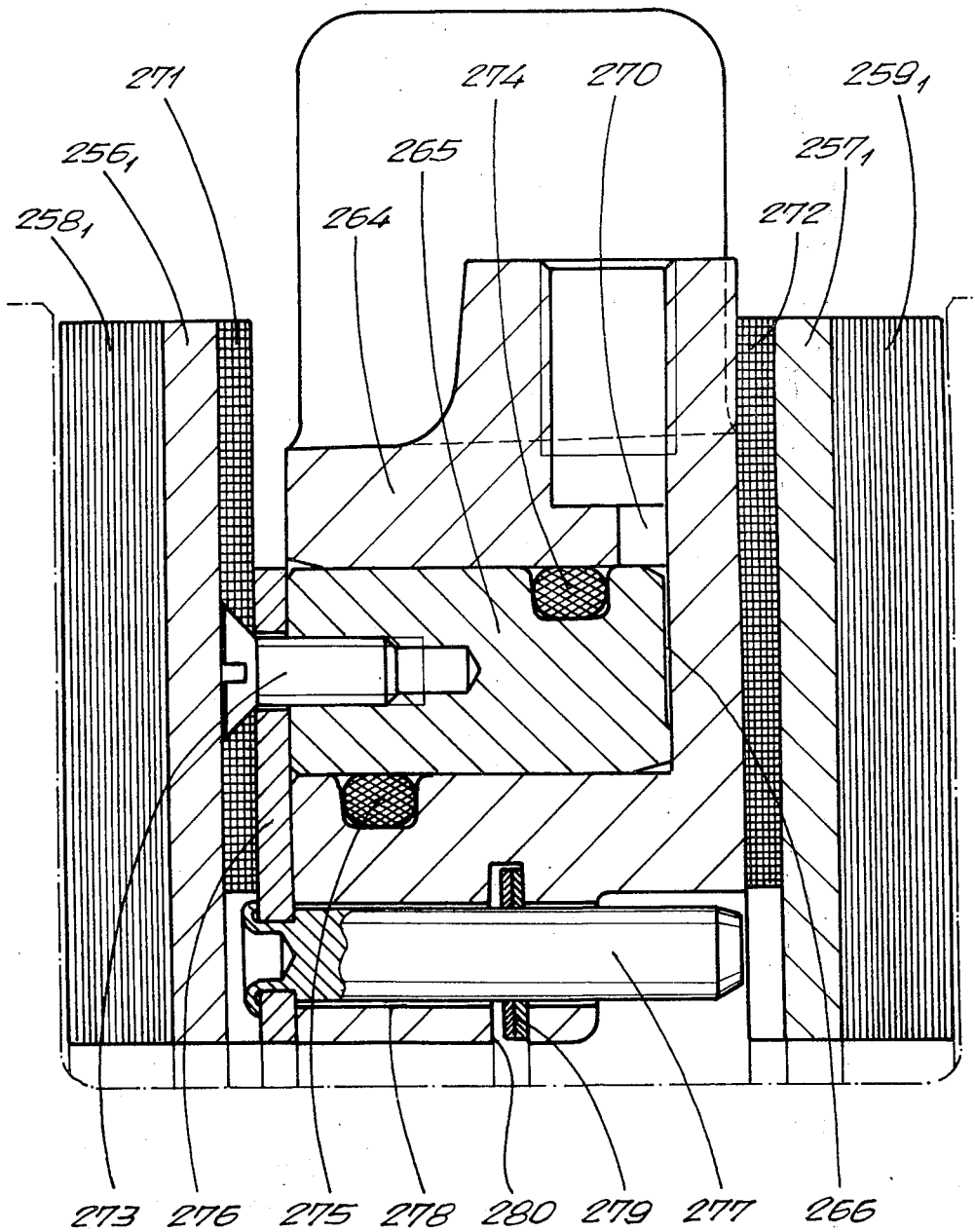
FIG. 9 is a section through the actuating unit of the brake of FIG. 7.

Because of the wear of the brake shoe linings, adjustment will be continuously required so as to keep a constant spacing between the braking surfaces of the brake housing and the friction linings of the brake shoes. A preferred adjustment mechanism which is automatic and continuous is shown in FIGS. 7 through 9. The adjustment mechanism comprises a support ring plate 276 mounted between insulating ring 271 and ring cylinder 264 secured by screws 273 to ring piston 265. Circumferentially spaced pins 277 are riveted at one end to ring plate 276. Pins 277 are slidably disposed in circumferentailly spaced boreholes 278 provided at corresponding locations in ring cylinder 264. A snap ring 279 fits about pin 277 in a slot formed in the wall of borehole 278. When play develops because of wear of the friction-linings, snap rings 279 will slide on pins 277 when the brake is actuated and will keep the brake shoes $256_1$, $256_2$, $257_1$, $257_2$ in position during the return motion. The spacing between them and the rotating braking surfaces therefore will remain constant.

Figure 10:
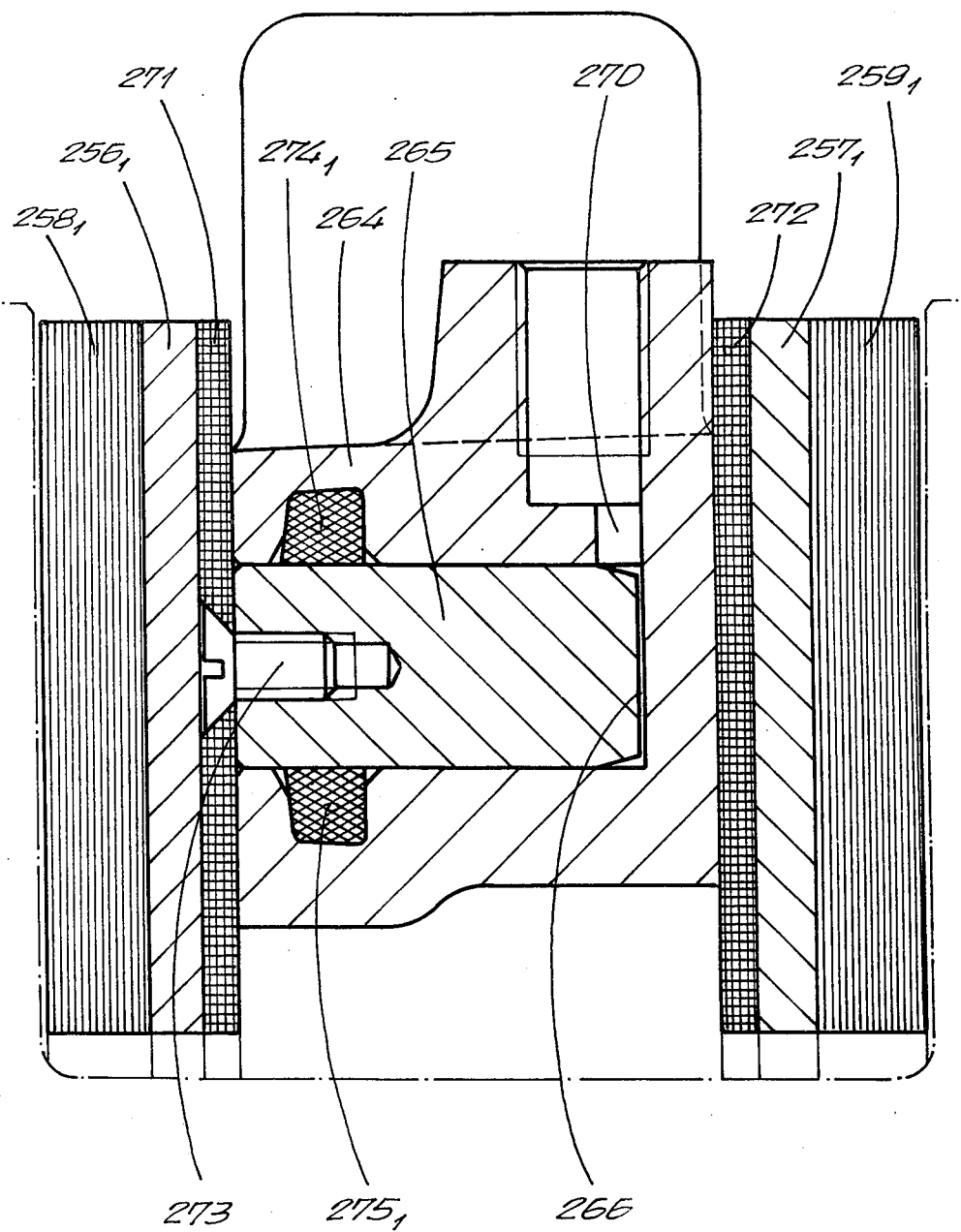
FIG. 10 is a section through a variation of the actuating unit of the brake of FIG. 7.

The embodiment shown in FIG. 10 differs from the one of FIG. 9 by disposing sealing rings $274_1$, $275_1$ diametrically opposite each other in grooves which are square in cross-section in ring cylinder 264. The sealing rings $274_1$ and $275_1$ are square in cross-section.

This embodiment of a brake with a hydraulic actuation unit is of similar characteristics as in the previously described embodiments.

FIGS. 11 and 12 illustrate an embodiment of a hydraulically actuated front-wheel brake of a heavy truck. Wheel hub 304 is journaled on steering knuckle 301 by means of taper roller-bearings 302 and 303; the wheel, which is not shown, is bolted to wheel hub 304. The two finned halves of the brake housing, 306 and 307, are secured to the hub by means of bolts 305. In the present embodiment, the steering knuckle 301 is designed to also be the holder or carrier for the brake shoes. Brake shoe carrier or bracket $301_1$ is integral with steering knuckle 301 and extends underneath and around the brake housing 306, 307. Removable arm 308 is disposed 180° around the circumference of the brake housing from bracket $301_1$. Arm 308 is cylindrical and may be screwed off, being mounted to steering knuckle 301 by locking bolt 309. Segments 310, 311, 312, and 313 of the brake shoes holding the friction-linings are suspended from the cylindrical brake holder arm 308 by means of shoulders $310_1$, $311_1$, $312_1$, $313_1$ having openings therethrough to receive member 308. The shoulders are offset in such manner that they will mutually enclose one another. The segmented brake shoes 310, 311, 312 and 313 rest on the fixed bracket $301_1$ disposed radially outwardly and below them while simultaneously bracing each other. The hydraulic actuation unit consists of ring cylinder 314 which is supplied with oil under pressure from line 315, and of ring piston 316. Sealing rings 318 and 319 are disposed in annular grooves in ring cylinder 314 and ring piston 316, respectively. Ring piston 316 and ring cylinder 314 transmit their actuating force through insulating rings 320 and 321 to the divided brake shoe segments 310 through 313. The actuation unit is designed in such manner and so mounted between the brake shoes in the brake housing that its spreading or expansion force will be exerted where the resulting friction force of the linings against the braking surface is effective. This prevents relative changes in position between the brake shoes when they are separated by the actuating mechanism. Ring cylinder 314 is supported by ribs 322 and 323 on members $301_1$ and 308. Circumferentially spaced radial fins insure heat transfer to the air passing by the wheel (FIG. 12).

A compressed-air actuated front-wheel brake of a heavy truck is shown in FIGS. 13 through 15; FIGS. 16 and 17 show variation of an actuating mechanism in partial sections. While in the example of FIGS. 13 through 15, ring seals which are V-shaped in cross-section are shown for the compressed-air actuating chamber, a closed rubber bellows is used as the actuating member in FIGS. 16 and 17.

A brake shoe supporting bracket 1 is illustrated in FIGS. 13 through 15. A front wheel hub 4 is journaled by means of taper roller bearings 2 and 3 on a steering knuckle. A wheel (not shown) is bolted to hub 4. Brake shoes 10, 11, 12 and 13 are disposed in an annular channel between the inner braking surface of brake housing halves 6 and 7. Brake holder 1 is bent around the bottom of the brake housing to form a fixed brake shoe support arm 1, over the channel between the brake housing halves. Radial fins are provided for better heat transfer. Halves 6 and 7 are secured to hub 4 by means of screws 5. Opposite the integral brake support arm $1_1$, which is integral with brake shoe holder member 1, (at the top of FIG. 13) detachable pin 8 is fastened by means of a screw 9 in a bore of brake shoe holder 1. Brake pin 8 is disposed in the openings in $10_1$, $11_1$, $12_1$ and $13_1$ of brake shoes 10 through 13. After removing screw 9, the brake shoes 10 through 13 may be removed from the brake by means of brake-holder pin 8, without having to take apart the actuating unit. The brake shoe actuating unit has ring cylinder 14 and an axially movable ring piston 17 disposed therein, which is sealed by means of seals 15 and 16 in grooves in piston 17. Ring piston 17 and cylinder 14 are held together by means of tension springs 18 evenly spaced about the periphery. Plates 19 and 20 insulate the actuating members from heat developed in the brake shoes. Compressed-air chamber $14_1$ of the ring cylinder 14 is connected with the compressed air supply 21 by means of borehole $14_2$. Extensions 22 and 23 of ring cylinder 14 provides the support for the actuation unit on the brake shoe support arm $1_1$.

FIGS. 16 and 17 are partial sections of another actuation unit. In this instance sealing of the pressure chamber between the ring cylinder 14 and ring piston 17 is obtained by means of a sealed synthetic rubber bellows 24 resting by its ends in grooves $25_1$ and $25_2$ of ring piston 25 and abutting the inside wall of ring cylinder 26. The compressed-air for inflating the rubber bellows 24 and hence for actuation of the brake is supplied via a threaded fitting 27 and a connector $24_1$ locked in an annular recess $26_1$ of the ring cylinder.

In a further embodiment of the invention, the cylinders for releasing the brake shoes are designed as annular cylinders concentric with the braking surfaces, Also, the compression springs of the invention are designed as sets of cup springs. Such springs are advantageous over conventional springs because for suitbly selected dimensions in the range of lining wear, a practically constant compression will be achieved.

In a still further design of the invention, the brake with compressed-air relief is provided with a center ring which may move axially within a U-shaped cylinder and which transmits the braking pressure to the brake shoes by means of two concentrically arranged sets of compression springs. The invention proposes mounting the set of compression springs within the cylinder defined by two differential pistons.

FIGS. 18 through 20 show additional embodiments of the invention. Each time, the figure illustrates half of a brake of a truck in longitudinal section. FIGS. 18 and 19 show a brake with spring actuation and compressed-air venting; FIG. 20 shows a brake with spring actuation and oil-pressure lifting. Brake-housing halves 102 and 103 are secured to hub 101 by locking bolts 104 to rotate therewith. In the embodiment having spring actuation with pneumatic of FIGS. 18 and 19, provision is made for an actuating housing between the brake shoes 105 and 106, consisting of two radially spaced rings with angular profiles, 107 and 108, and of a disk 109 disposed in parallel relationship against the brake shoes. Rings 107 and 108 are shaped to provide an opening for an axailly movable thrust ring 110 which is rigidly connected with two disks 111 and 112 slidably disposed between rings 107 and 108. Disk 111 is sealed at its outer periphery against ring 107 by a gasket $111_1$ with its lips vulcanized into its surface, and is sealed at its inside periphery with respect to ring 108 by such a gasket $112_1$, sealing taking place at the cylindrical surfaces of angular rings 107 and 108 of the housing. The spaces between angular rings 107 and 108 and ring 110 are sealed by gaskets $107_1$ and $108_1$ vulcanized onto the cylindrical surfaces of thrust ring 110. This produces two radially spaced pressure chambers 113 and 114 which are interconnected by boreholes 115. These chambers are filled with compressed-air in the released state of the brake, the compressed-air being supplied through connecting member $107_2$ and borehole $107_3$. Two sets of cup springs 116 and 117 are seated between disks 111 and 112 on one side and 109 on the other, the cup springs being prestressed for the lifted state of the brake that is shown. If the air pressure is reduced in chambers 113 and 114, the pressure applied by springs 116 and 117 against the thrust ring 110 through disks 111 and 112 will cause the thrust ring to move axially as an annular piston in accordance with the clearance between the brake shoes and braking surfaces and braking will be initiated.

Adjusting pins 118 are provided with buttress threads as shown in the partial section in FIG. 19 and in part of FIG. 18, the pins being evenly distributed about the periphery. Collars $118_1$ of pins 118 are seated in such a manner that on one hand there will be play between springs 116, 117 and recess $109_1$ in disk 109 and on the other the buttress thread will pass through lugs $110_1$ and $110_3$ of the thrust ring 110 which are made elastic by means of radial millings $110_1$. If, because of wear of the linings the lift-play exceeds the radial play of collar $118_1$ of adjusting pin 118, the buttress thread of pin 18 will jump forward by one pitch in the elastic thread of the thrust ring lugs $110_2$ and $110_3$, and the clearance is adjusted thereby. When the linings are worn down entirely, the brake shoes may be pulled out without having to open the actuation unit. In order to replace the worn brake shoes 105, 106 by new ones, the adjustment setting must be brought back to the original position. To that end, a hexagonal recess $118_2$ is provided in the collar $118_1$ of the adjusting pin 118, the initial position of the actuation unit when installing new brake shoes being set with a suitable wrench without dismantling the brake housing 102, 103.

FIG. 20 shows a brake with spring actuation and hydraulic lift. The actuation unit has stepped pistons 119 and 120 sealed by cord-gaskets $119_1$ and $120_1$. A cup spring set 121 is compressed between a thrust ring 123 and a leg of stepped piston 119. Thrust ring 123 is held against piston 119 by a slip ring 122 mounted between brake shoes 105 and 106. The outer stepped piston 119 is provided with a female connector $119_2$ and a borehole $119_3$ for the supply of oil under pressure for brake release. If braking is necessary, the oil pressure in pressure chamber 124 will be reduced until the pressure is transmitted to the brake shoes because of the compression of the spring 121 and so that the required braking torque is produced. Oil under pressure may be supplied either from a servo-pump or from a compressed-air/oil pressure converter, appropriately equipped with a pressure reservoir. Constant lift-play or brake adjustment may be achieved by mounting an adjustment cylinder with a trailing piston or a membrane with a correspondingly limited lifting and transmission valve towards the brake in the pressure circuit. Such hydraulic adjustments are ordinarily useful only to a limited extent for ordinary hydraulic pressure actuation, the temperature rise of the oil being unavoidable when braking and therefore locking of the brake being possible because of the insuing expansion of the oil. In the present case, however, oil expansion takes place so as to favor enlargement of braking play; therefore this illustration provides a meaningful application of the simple adjustment process of the invention.

FIGS. 21 through 23 show an embodiment of a brake for a commercial vehicle, shown in longitudinal section in FIG. 21 and in cross-section in FIG. 22. For the sake of clarity, the actuation unit is omitted; it may be hydraulic, pneumatic or mechanical. The brake shoes support member is denoted by 419. A wheel hub 422 is journaled on a steering knuckle by bearings 420, 421. Bolts 423 connect the hub 422 to the rotating, two-part brake housing 424, 425. The semi-circular brake shoes $426_1$, $426_2$ and $427_1$, $427_2$ are provided with outer extensions $426_3$, $426_4$, $426_5$ and $426_6$ with respect to the semi-circular brake shoes $426_1$ and $426_2$. In the present example, the brake shoe support arm $419_1$ is a component of brake holder 419. The arm is U-shaped in cross-section and seats protruding members $426_4$ and $426_6$ of brake shoes $426_1$ and $426_2$ as well as those not shown which belong to elements $427_1$ and $427_2$. The detachable and U-shaped brake support arm 428 is mounted opposite the fixed brake holder extension $419_1$, arm 428 being connected to the brake holder 419 by means of screws 429. Protruding member $426_3$ of brake shoes $426_1$ and protruding member $426_5$ of brake shoe $426_2$ and the corresponding protruding members of the two brake shoes $427_1$ and $427_2$ are supported in the U-shaped recess of arms 428. This arm 428 can be removed after loosening screw 429, and the brake shoes may be taken out.

FIG. 23 shows an embodiment of brake shoe support arm 428' in a partial cross-section, wherein the U-shaped extension members $428'_1$ and $428'_2$ subtend an angle with one another, so that a tighter connection than for parallel U-legs shall be established at brake holder 419 when tightening screws 429'.

Although the invention has been described in detail for the purpose of illustration, it is to be understood that such detail is solely for that purpose and that variations can be made therein by those skilled in the art without departing from the spirit and scope of the invention except as it may be limited by the claims.

What I claim is:

1. A fully lined disk brake assembly for a vehicle wheel comprising
    a brake housing comprising an annular member having an annular gap of channel-like cross-section open on its radially exterior side, said channel-like gap having inner sides which provide annular braking sufaces, said brake housing being attached to be rotatable jointly with a wheel of an assembly to be braked;
    at least one pair of segmental disk brake shoes disposed from the radially exterior side into the channel-like gap having friction races facing the adjacent braking surface;
    means for non-rotatably supporting each pair of brake shoes in the gap comprising a pair of diametrically opposite members attachable to a non-rotating part of a brake and wheel assembly, at least one of the pair being adapted to be removed from over the open side to permit replacement of the brake shoes without dismantling the means for actuating the brake shoes; and
    means for moving said brake shoes into contact with said braking surfaces disposed between the brake shoes and comprising thrust rings disposed between and against the brake shoes, said thrust rings having means adapted to be disposed on the said diametrically opposite members which extend over the open side of the channel to support the thrust rings in the channel between the brake shoes, a pair of actuating rings disposed between the thrust rings, a pair of concentric races filled with ball-bearings extending around the peripheries of a first of said actuating rings facing a first thrust ring, a pair of concentric races filled with ball-bearings around the peripheries of the second thrust ring and facing the second of said actuating rings, and a plurality of circumferentially spaced slot-like races each having a ball-bearing therein disposed to contact the second thrust ring and the first actuating ring between the concentric bearing races when the actuating rings and thrust rings are associated together between the brake shoes, whereby rotation of the actuating rings moves the thrust rings and the brake shoes towards the braking surface; said brake shoes having an extension means thereon which is associated with said members to support the brake shoes in the gap.

2. The brake assembly of claim 1 wherein the thrust rings are biased towards each other by springs.

3. The brake assembly of chain 1 wherein said actuating rings have integral complementary spaced ears on their peripheral edges with aligned openings and thrust rollers disposed between the ears, and said brake assembly comprises a double cam rotatably disposed on the brake assembly and associated with said rollers.

4. A fully lined disk brake assembly for a vehicle wheel having a hub comprising a. a two-piece brake housing having inner surfaces in axially spaced face to face relation with an annular gap therebetween which is open on its radially outward side, said inner surfaces providing braking surfaces, means for securing the housing to the hub for rotation therewith;

b. a pair of semi-circular brake shoes lined with friction linings and disposed in the gap in axially spaced apart relationship with the lining of one facing the braking surface of one of the said inner surfaces and the lining of the other facing the other inner surface of the housing, said brake shoes contacting each other at their ends, an extension member extending radially outwardly from the periphery of each brake shoe;

c. means between the brake shoes for moving the brake shoes axially towards the said braking surfaces comprising a pair of thrust rings disposed in the gap, a pair of extension members extending radially outwardly from each thrust ring;

d. means for supporting the brake shoes and thrust rings in the gap against circumferential movement but free to move axially comprising a brake holder and a pair of arms secured to the brake holder and disposed across the gap diametrically opposite each other with respect to the periphery of the brake shoes, one of said extensions on each brake shoe being supported by one of the arms and the other being supported on the other arm, one extension on each thrust ring being supported by one arm and the other by the other arm, at least one of the arms being pivotally secured to the holder whereby it can be moved from across the gap to provide access to the gap and its contents for removing the brake shoes from the gap without disassembly of the brake shoe actuating means; and e. means for moving the thrust rings and brake shoes axially towards the breaking surfaces.

5. The brake assembly of claim 4 wherein the said extensions on the two brake shoes subtend the same angles with respect to the edges of the brake shoes.

6. The brake assembly of claim 4 wherein the said extension members carried by the brake shoes are bifurcated and the arms have rounded edges, said arms being movable from over the open side of the channel.

7. The brake assembly of claim 4 wherein the housing is two disks having centrally disposed openings and rims about the openings, said disks being secured together with the rims abutting each other and attachable to the hub of a vehicle wheel for rotation therewith.

8. The brake assembly of claim 7 wherein said disks are provided with radially extending circumferentially spaced fins around their periphery.

9. A fully lined disk brake assembly for a vehicle wheel comprising a. a pair of circular cover plates secured together with inner surfaces is axially spaced face to face relation to form a brake housing having a gap between covers which is open on its radially outward side, said inner surfaces providing braking surfaces, said plates having aligned centrally disposed openings adapted to receive a hub of a wheel, means for securing the housing to the hub for rotation therewith;

b. a pair of semi-circular brake shoes lined with friction linings and disposed in the gap in axially spaced apart relationship with the lining of one facing the braking surface of one cover plate and the lining of the other facing the braking surface of the other cover plate, said brake shoes contacting each other at their ends, a bifurcated shoulder extending radially outwardly from the periphery of each brake shoe;

c. means between the brake shoes for moving the brake shoes axially towards the said braking surfaces comprising a pair of actuating rings and between each actuating ring and a brake shoe a thrust ring having diametrically opposite bifurcated shoulders extending radially outwardly therefrom, each of said actuating rings having pressure roller means, spring means for biasing said actuating rings together, an S-shaped cam rotatably supported on the brake holder and associated with said pressure rollers whereby upon rotation of the cam the thrust rings are moved axially against said brake shoes to press the brake linings against the braking surfaces;

d. means for supporting the brake shoes, thrust rings and actuating rings in the gap comprising a brake holder and a pair of rod-like arms secured to the brake holder and disposed across the gap diametrically opposite each other with respect to the periphery of the brake shoes, one of said shoulders of each pair of brake shoes being supported by one of the arms and the other shoulder being supported on the other arm, a shoulder of each thrust ring disposed on each arm, at least one of the arms being pivotally secured to the holder whereby it can be moved from across the gap to provide access to the gap and its contents for replacing the brake shoes without disassembly of the brake shoe actuating means; and e. means for actuating the cam.

* * * * *